United States Patent [19]

Farquhar

[11] Patent Number: 5,332,251
[45] Date of Patent: Jul. 26, 1994

[54] TRAILER HITCH LOCK

[76] Inventor: Michael F. Farquhar, 2784 Cravey Dr., Atlanta, Ga. 30345

[21] Appl. No.: 91,975

[22] Filed: Jul. 15, 1993

[51] Int. Cl.⁵ .............................................. B60D 1/28
[52] U.S. Cl. ....................................... 280/507; 70/14
[58] Field of Search ................... 280/507, 515; 70/14, 70/58, 57, 258

[56] References Cited

U.S. PATENT DOCUMENTS

| 2,077,825 | 4/1937 | Davidson | 411/340 |
|---|---|---|---|
| 2,641,124 | 6/1953 | Gallagher et al. | 70/232 |
| 3,884,055 | 5/1975 | Vuillemot | 70/58 |
| 4,376,544 | 3/1983 | Sette et al. | 70/14 |
| 4,380,160 | 4/1983 | Hoffman | 70/14 |
| 4,440,005 | 4/1984 | Bulle | 70/14 |
| 4,480,450 | 11/1984 | Brown | 70/14 |
| 4,571,964 | 2/1986 | Bratzler | 70/58 |
| 4,693,096 | 9/1987 | Mercer | 70/14 |
| 4,774,823 | 10/1988 | Callison | 70/14 |

FOREIGN PATENT DOCUMENTS

| 2822839 | 11/1979 | Fed. Rep. of Germany | 70/14 |
|---|---|---|---|
| 3049470 | 7/1982 | Fed. Rep. of Germany | 280/507 |
| 3150783 | 6/1983 | Fed. Rep. of Germany | 280/507 |
| 3410606 | 10/1984 | Fed. Rep. of Germany | 280/507 |
| 2668738 | 5/1992 | France | 280/507 |
| 2229688 | 10/1990 | United Kingdom | 70/14 |

Primary Examiner—Margaret A. Focarino
Assistant Examiner—Kevin Hurley
Attorney, Agent, or Firm—Jones & Askew

[57] ABSTRACT

A trailer hitch lock assembly for disabling the trailer hitch of an unattached trailer to prevent theft of the trailer. The trailer hitch lock obstructs access to the trailer eyelet in the drawbar of the trailer hitch to prevent unauthorized hitching of the trailer to a truck with a military hitch. The trailer hitch lock comprises an upper bolt plate with a bolt that that extends through the eyelet of the trailer hitch and engages a lower shield plate. A padlock engages a hole in the end o the bolt to secure the bolt plate and the shield plate together. The shield plate has a cylindrical shield which surrounds and protects the padlock from tampering.

4 Claims, 2 Drawing Sheets

TRAILER HITCH LOCK

TECHNICAL FIELD

This invention relates generally to anti-theft locking devices for trailer or towing hitches. More specifically, the invention relates to a trailer hitch lock assembly which obstructs access to the hitch and thereby deters theft of the trailer.

BACKGROUND OF THE INVENTION

Many trailers have trailer hitches comprising a drawbar and eyelet. Such drawbar and eyelet trailer hitches are connected to the trucks or tractors by means of a military hitch on the truck or tractor. Many times it is necessary for a loaded or empty trailer to be left unattended and not attached to a truck. It is particularly easy for a thief to simply hook these trailers up to a truck and drive away, stealing the trailer and its cargo. There is a need for a trailer hitch lack to disable the drawbar and eyelet hitch of an unattached trailer vehicle in order to prevent the attachment of a truck with a military hitch operated by someone intending to steal the trailer.

SUMMARY OF THE INVENTION

Stated in general terms, the present invention is directed to a trailer hitch lack for use in preventing the theft or unauthorized use of an unattached trailer having a drawbar and eyelet hitch. The trailer hitch lack of the present invention consists of two parts. The first part is a steel plate attached to a bolt or screw which has a hole through the distal end thereof. The bolt or screw fits through the eyelet of the trailer hitch and engages the second piece of the lock. The second piece of the lock consists of a plate with a threaded central opening which receives the bolt of the first piece of the lock. The second piece of the lock also has a shield surrounding the area which receives the bolt to obstruct side access to the end of the bolt. Once the bolt of the first piece is fitted within the second piece, a conventional padlock is placed through the hole of the bolt to lock the two pieces together within the eyelet of the trailer hitch. The shield of the second piece permits attachment of the padlock but effectively surrounds the shackle of the attached padlock to limit access thereto by jaws of metal cutters, hack saw blades and the like which might be used to sever the shackle to remove the trailer hitch lock.

It is the primary object of the invention to provide a trailer hitch lock which includes a first steel plate with a downwardly extending bolt or pin with a transverse hole for receiving a padlock and a second steel plate with a central aperture through which the bolt or pin passes and a shield surrounding the lower end of the bolt so as to provide a housing for coveting a padlock so that such padlock cannot be easily tampered with.

It is another object of the present invention to provide an inexpensive trailer hitch lock which serves to prevent the theft of unattached trailer vehicles.

It is a further object of the present invention to provide a trailer hitch lock for use with trailer hitches wherein the components of the lock assembly are protected from tampering by being enclosed within a substantially continuous housing.

It is yet another object of the present invention to provide a trailer hitch lock to be used on an unattended trailer so as to obstruct access to the trailer hitch to prevent the trailer from being hitched to an unauthorized truck and stolen.

Other objects, features and advantages of the present invention will become apparent upon reading the following specification, when taken in conjunction with the drawings and the claims.

DETAILED DESCRIPTION

Figure 1:
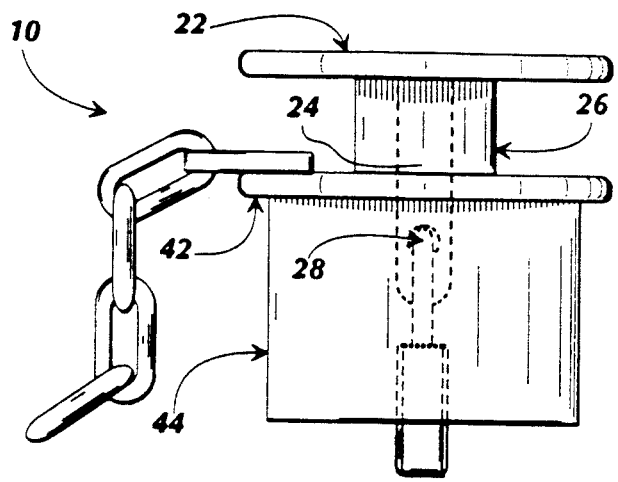
FIG. 1 is a side elevational view of the trailer hitch lock of the present invention.
Figure 2:
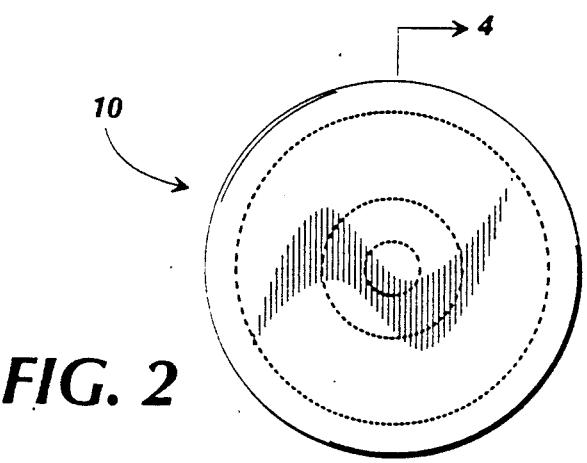
FIG. 2 is a top plan view of the trailer hitch lock of the present invention.
Figure 4:
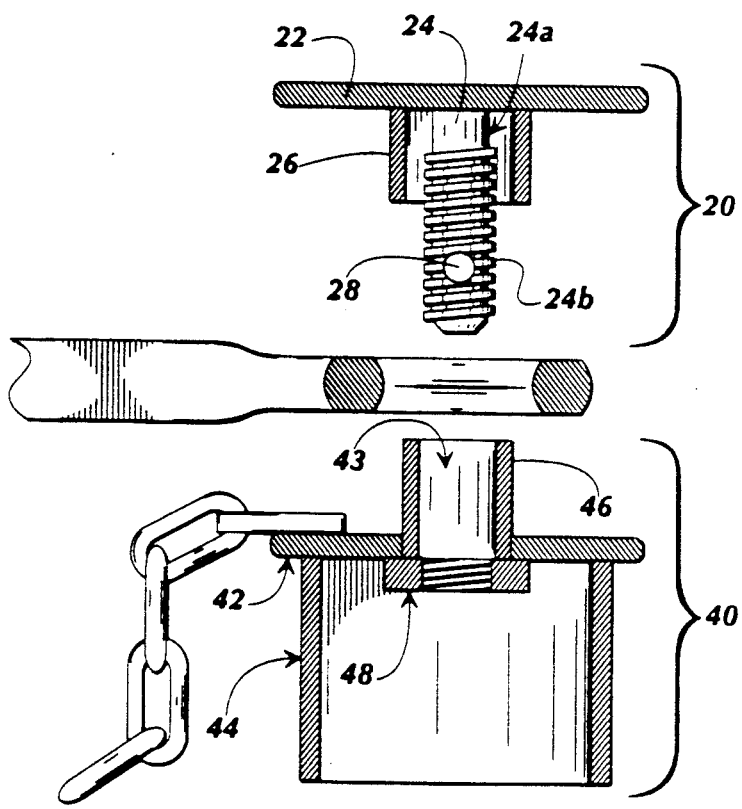
FIG. 4 is an exploded side elevational view of the trailer hitch lock of the present invention positioned for attachment to the eyelet of a trailer hitch.
Figure 3:
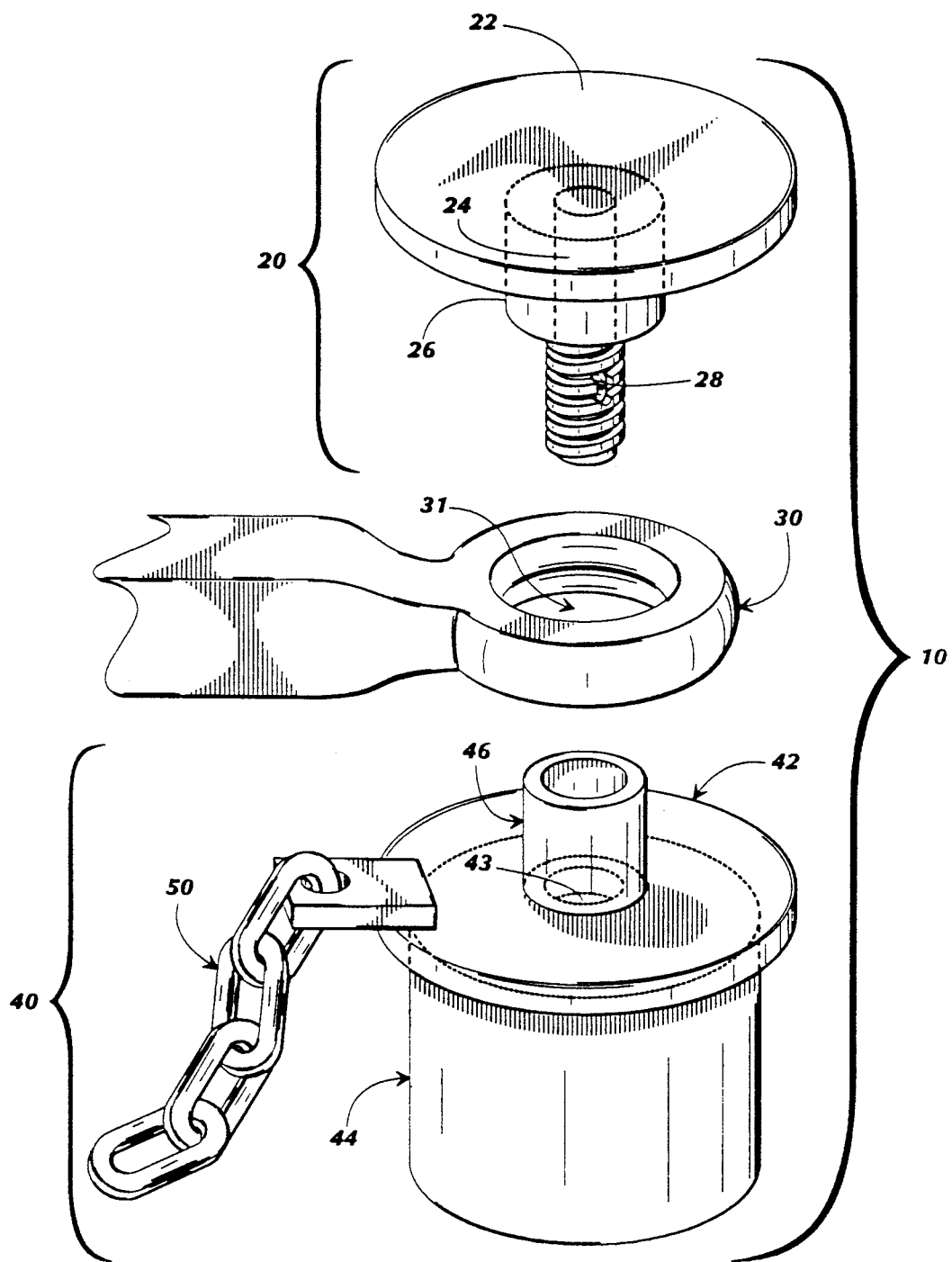
FIG. 3 is an exploded perspective view of the trailer hitch lock of the present invention positioned for attachment to the eyelet of a trailer hitch.

Referring now in detail to the drawings, in which like numerals refer to like parts throughout the several views, FIG. 1 illustrates the trailer hitch lock assembly 10 in accordance with the present invention. The trailer hitch lock 10 comprises two parts, a bolt plate 20 and a shield plate 40, shown separately in FIG. 3.

Bolt plate 20 comprises plate 22 with downwardly projecting bolt 24. Bolt 24 has a fixed portion 24a and a distal portion 24b. The distal portion of the bolt 24b contains a transverse hole 28. Distal portion 24b of bolt 24 is threaded. The diameter of the hole 28 is larger than the shackle of a conventional padlock (not shown) which is intended to be used with trailer hitch lock 10. Tube 26 is centrally attached to plate 22 and extends over the fixed portion 24a of bolt 24. The outer diameter of tube 26 is less than the inner diameter of eyelet 31 of the trailer drawbar 30 with which trailer hitch lock 10 is intended to be used. Tube 26 and bolt 24 are welded to plate 22 or otherwise conventionally attached according to the selected material of each of tube 26, plate 22 and bolt 24. Plate 22, bolt 24 and tube 26 are composed of a material such as steel or any other tamper resistance metal.

Shield plate 40 comprises plate 43 having a central aperture 43 for receiving bolt 24. Aperture 43 is defined by tube 46 which is mounted at aperture 43 in an upwardly projecting fashion. The outer diameter of tube 46 is smaller than the inside diameter of tube 26 and the inner diameter of tube 46 is larger than the circumference of bolt 24. Aperture 43 is further defined by nut 48 which is centrally mounted to plate 42 on the opposite side of plate 42 from tube 46. Cylindrical shield 44 is attached to plate 42 so that when bolt 24 is received within aperture 43 and a padlock placed through hole 28, the padlock is surrounded by shield 44 to obstruct access to the padlock.

In order to engage the trailer hitch lock 10 into the eyelet 31 of the trailer drawbar 30, the tube 46 of the shield plate 30 is centrally aligned underneath eyelet 31 of trailer drawbar 30 and moved upward until the tube 46 is inserted into the eyelet 31 of trailer drawbar 30, and plate 42 is flush with the underside of the eyelet 31 of the trailer drawbar 30. While shield plate 40 is held in place within eyelet 31, bolt plate 20 is centrally positioned over the trailer drawbar 30 such that when bolt plate 20 is lowered, bolt 24 is received within tube 46 and threaded through nut 48. Tube 26 is positioned between tube 46 and the inner diameter of eyelet 31. After bolt plate 20 and shield plate 40 are fitted together, a conventional padlock is placed through hole 28 and locked. Shield, 44 encompasses the locked padlock and obstructs access thereto.

While the preferred embodiment has been disclosed with respect to distal portion 24a of bolt 24 being threaded and received by conversely threaded nut 48, it should be understood that other methods of fit can be employed to secure the bolt plate 20 and shield plate 40 together.

It should be understood that the preferred embodiment has been disclosed by way of example, and that other modifications may occur to those skilled in the art without departing from the scope and spirit of the claims.

What is claimed is:

1. A trailer hitch lock, comprising:
   a first plate having a downwardly projecting bolt having a fixed and a distal portion, said bolt having a transverse hole in said distal portion; and
   a second plate having a central aperture for receiving said bolt of said first plate and having a shield which surrounds the area receiving said bolt;
   whereby when said bolt of said first plate is received within said aperture of said second plate and a padlock is placed through said transverse hole of said bolt, said shield of said second plate surrounds the padlock; and wherein said distal portion of said bolt is threaded and said aperture of said second plate is conversely threaded.

2. A trailer hitch lock, comprising:
   a first plate having a downwardly projecting bolt having a fixed and a distal portion, said bolt having a transverse hole in said distal portion; and
   a second plate having a central aperture for receiving said bolt of said first plate and having a shield which surrounds The area receiving said bolt;
   a tube centrally mounted to said second plate and encompassing said aperture, said tube having an outer diameter less than the inner diameter of the eye of the trailer drawbar;
   whereby when said bolt of said first plate is received within said aperture of said second plate and a padlock is placed through said transverse hole of said bolt, said shield of said second plate surrounds the padlock.

3. A trailer hitch lock, comprising:
   a first plate having a downwardly projecting bolt having a fixed and a distal portion, said bolt having a transverse hole in said distal portion; and
   a second plate having a central aperture for receiving said bolt of said first plate and having a shield which surrounds the area receiving said bolt;
   a first tube centrally mounted to said first plate and surrounding said fixed portion of said bolt, said first tube having an outer diameter less than the inner diameter of the eye of the trailer first drawbar;
   whereby when said bolt of said first plate is received within said aperture of said second plate and a padlock is placed through said transverse hole of said bolt, said shield of said second plate surrounds the padlock.

4. The trailer hitch lock of claim 3 further comprising:
   said first tube having an inner diameter greater than the circumference of said bolt; and
   a second tube centrally mounted to said second plate and encompassing said aperture, said second tube having an outer diameter less than the inner diameter of said first tube and an inner diameter greater than the circumference of said bolt,
   whereby when said bolt of said first plate is received within said aperture of said second plate, said second tube is received within said first tube and said second tube encompasses said fixed portion of said bolt.

* * * * *